United States Patent [19]

Ogawa et al.

[11] Patent Number: 5,001,944
[45] Date of Patent: Mar. 26, 1991

[54] CONSTANT SPEED DRIVE UNIT

[75] Inventors: Kenichi Ogawa; Hitoshi Hyodo, both of Aichi, Japan

[73] Assignee: Aisin Seiki Kaubshiki Kaisha, Kariya, Japan

[21] Appl. No.: 424,007

[22] Filed: Oct. 19, 1989

[30] Foreign Application Priority Data

Oct. 19, 1988 [JP] Japan ............................... 63-263659

[51] Int. Cl.$^5$ ............................................ B60K 41/18
[52] U.S. Cl. ................................................... 74/866
[58] Field of Search ........................................ 74/866

[56] References Cited

U.S. PATENT DOCUMENTS

| | | | |
|---|---|---|---|
| 4,463,822 | 8/1984 | Tanigawa et al. | 74/866 X |
| 4,535,864 | 8/1985 | Tanigawa et al. | 74/866 X |
| 4,535,865 | 8/1985 | Tanigawa et al. | 74/866 X |
| 4,648,291 | 3/1987 | Klatt et al. | 74/866 |
| 4,736,813 | 4/1988 | Hayama et al. | 74/866 X |
| 4,913,006 | 4/1990 | Tsuyama et al. | 74/866 |
| 4,914,597 | 4/1990 | Moncelle et al. | 74/866 X |

*Primary Examiner*—Dirk Wright
*Attorney, Agent, or Firm*—Sughrue, Mion, Zinn, Macpeak & Seas

[57] ABSTRACT

A constant speed drive control unit, comprising a device for driving a throttle valve for a car provided with a fuel injection controller for cutting a fuel supply to an engine when the throttle valve comes to a first predetermined opening (0%) or below, and an automatic transmission controller for setting a speed stage of a speed change mechanism, an opening detector for detecting a throttle valve opening, a speed detector for detecting a car running speed, a speed controller for energizing the device for driving the throttle valve to coordinate the running speed with a desired car speed, and generating a shift-down assignment signal when the running speed exceeds the desired speed to the throttle valve coming to a second predetermined opening (5%) or below, and a speed change controller for changing the speed stage of the speed change mechanism to a lower stage in response to the signal. When the car comes to run on a descent while running on a high speed stage, the running speed becmes higher than the desired speed, thus the speed controller contracting the throttle opening. When the throttle valve comes to the second predetermined opening (5%), the speed controller generates the shift-down assignment signal, and the speed change controller shifts the speed change mechanism down to a lower speed stage in response to the signal.

1 Claim, 10 Drawing Sheets

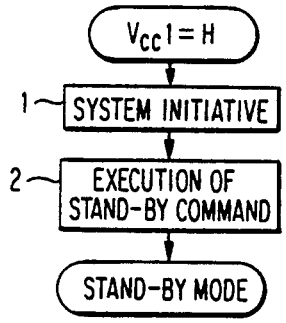
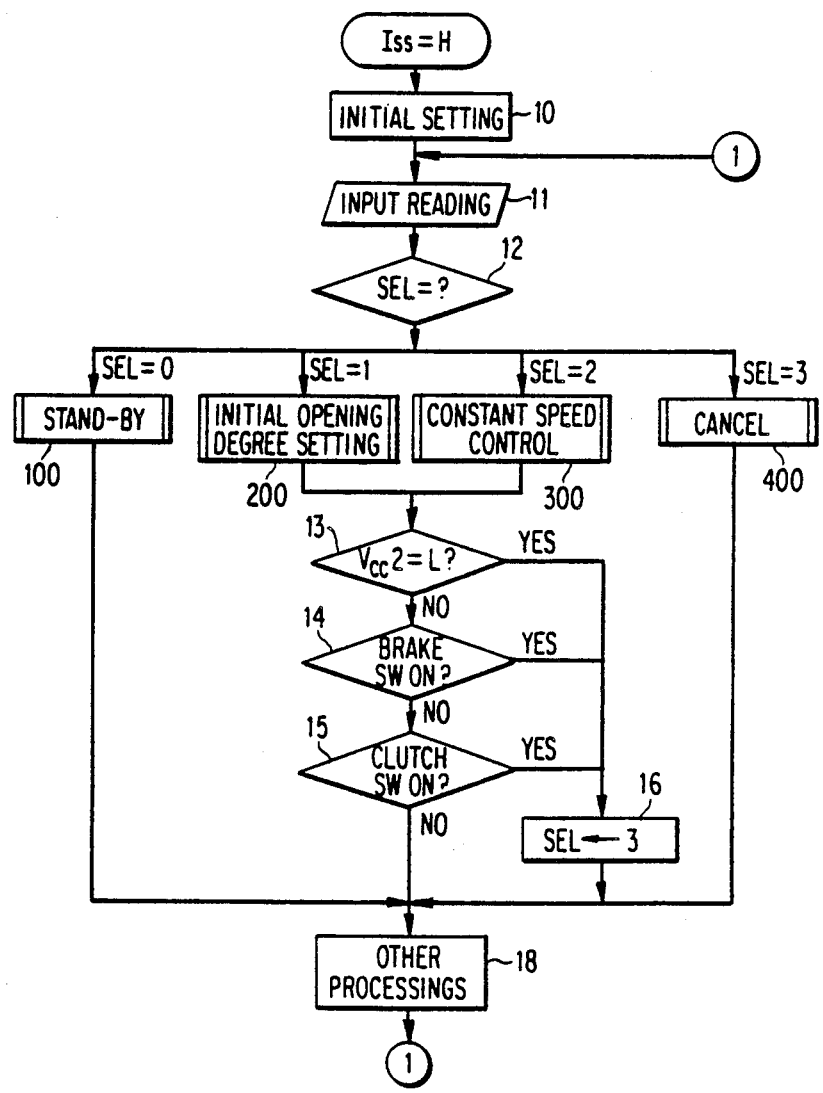

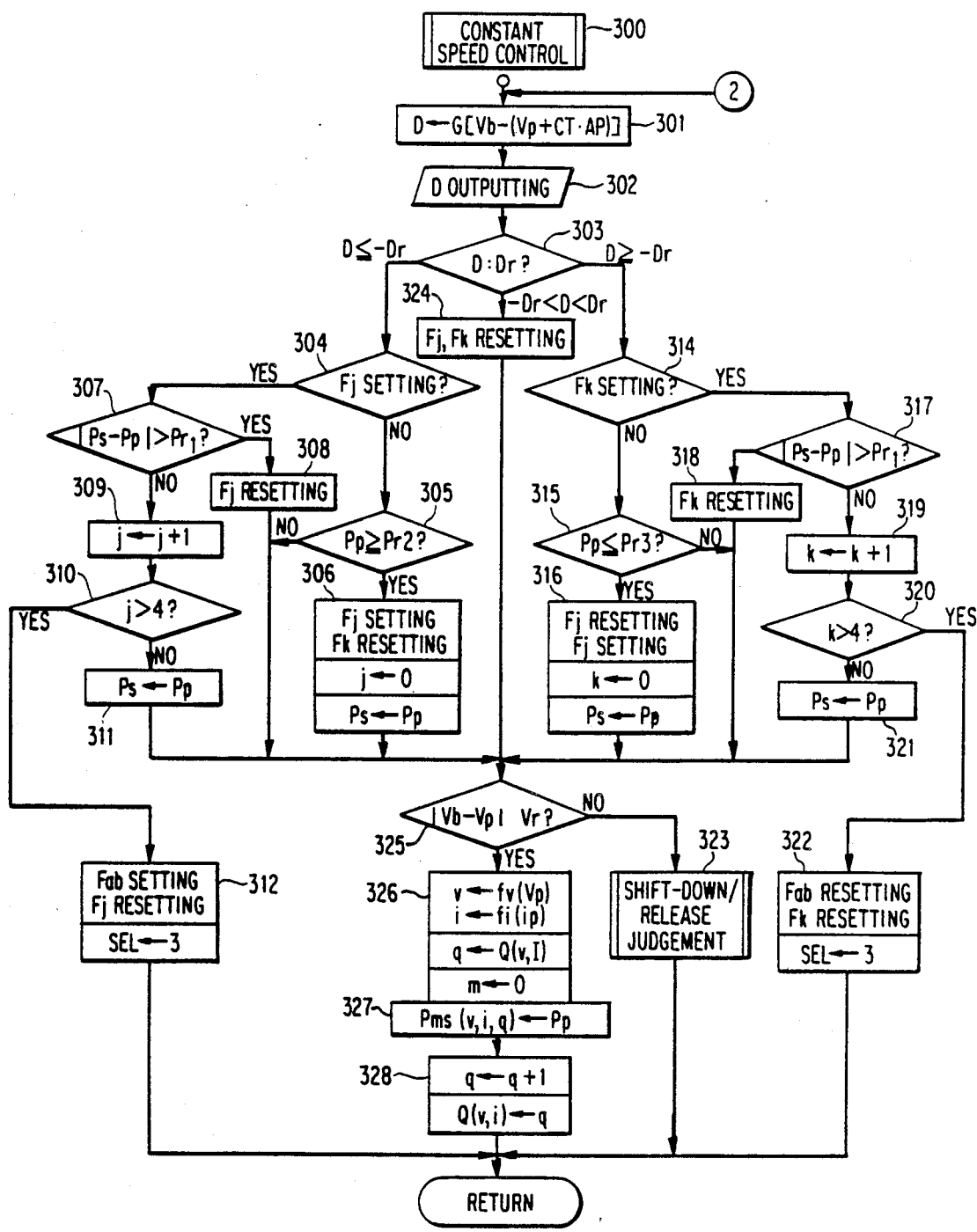

CONSTANT SPEED DRIVE UNIT

BACKGROUND OF THE INVENTION

1Field of the Invention

The present invention relates to a constant speed drive control unit for adjusting an opening of a throttle valve automatically so as to equalize a running speed of a car with a desired speed from comparing the two.

2. Description of the Prior Art

A constant speed drive control unit operates a throttle so as to adjust a current car running speed to a desired speed from increasing an opening of the throttle valve to acceleration when the car running speed is lower than the desired speed through comparison or from decreasing the throttle valve opening to deceleration when the former is higher, however, particularly at the time of descending where a speed change mechanism is set at high speed stage, the running speed becomes higher than the desired speed, and even from minimizing the throttle valve opening, the running speed does not decrease, and while the throttle valve opening gets gradually small, the running speed does not come up with the desired speed for unsatisfactory engine brake effect.

For prevention, for example, according to the constant speed driving gear disclosed in Japanese Patent Laid-Open No. 2740/1988, when the throttle valve is full close and the running speed is increasing, a speed stage of the speed change mechanism is changed (or shifted down) to a low speed stage.

However, in a car provided with fuel injection controller (or electron-controlled fuel injector, which is called "EFI" hereinafter), a fuel supply to an engine is subjected to an optimal control on throttle valve opening, air flow, engine rotational frequency and others by means of an electronic controller such as microcomputer or the like, and the fuel supply is cut (called "fuel cut" hereinafter) when the engine runs at a predetermined rotational frequency or over with the throttle valve in idling opening (may be called "full close" for example). This is an effective manner of control to cause enhancement of the power of an engine brake and enhancement of a fuel consumption, however, the following disadvantages may result:

That is, if the constant speed drive control unit drives and closes the throttle valve for suppressing acceleration of a car at running on a steep descent, then the valve may be closed full sometimes. In this case, a fuel cut condition is realized and EFI operates accordingly, however, if a car speed is decreased suddenly from having a brake power applied to the car from the engine for the fuel cut, the constant speed drive control unit then drives to open the throttle valve so as to suppress a deceleration of the car, therefore the fuel cut condition comes unrealized this time, and thus EFI removes the fuel cut (feeding the fuel). The car speed is increased again by resupply of the fuel, thus repeating what has been mentioned above to surging of the car.

SUMMARY OF THE INVENTION

An object of the invention is to prevent an occurrence of the aforementioned surging at the time of running on a descent or the like.

In order to attain the above object, the constant speed drive control unit of the invention comprises drive means for operating a throttle valve of a car provided with a fuel injection controller for cutting a fuel supply to an engine at the time of low load with an opening of the throttle of the engIne being a first predetermined opening $P_{s1}$ or below as one condition, and an automatic speed change controller for setting a speed stage of a speed change mechanism correspondingly to a driving torque of the engine and a car speed; opening detection means for detecting an opening of the throttle valve; speed detection means for detecting a running speed of the car; speed control means for energizing the drive means in the direction where a desired speed and the running speed are concordant with each other through comparing both, and generating a shift-down assignment signal when the running speed exceeds the desired speed and the throttle valve opening is at a second predetermined opening $P_{s2}$ or below which is larger than the first predetermined opening $P_{s1}$; and speed change control means for changing the speed stage of the speed change mechanism to a lower stage in response to the shift-down assignment signal.

For example, when a car comes to a descent while running at a high speed stage, a running speed becomes higher than a desired speed, and thus the speed control means contracts a throttle opening. That is, the running speed corresponds counter to the throttle opening. When the throttle opening becomes $P_2$, the speed control means generates a shift-down assignment signal, and the speed change control means shifts the speed change mechanism down to a lower speed stage in response thereto. An engine brake effect is enhanced according to the shift-down, the running speed is then correlated close with the throttle valve opening, i.e. the running speed comes to correspond directly to the throttle opening, the running speed becomes slow and the speed control means enlarges the throttle opening correspondingly thereto.

Thus, the speed change mechanism is shifted down where the throttle valve opening is at $P_{s2}$ larger than $P_{s1}$ whereat EFI stops a fuel injection, a relation of the running speed to the throttle valve opening is inverted from corresponding counter to corresponding directly, i.e. the engine brake operates full, the running speed is decreased, the throttle valve is opened to adjust the running speed to the desired speed, and the throttle valve opening is kept at $P_{s2}$ or over. Accordingly, EFI will not stop the fuel injection, and a surge will never arise at the time of descending.

Other objects and features of the invention will become apparent from the following examples described with reference to the accompanying drawings.

BRIEF DESCRIPTION OF THE DRAWINGS

FIG. 2, FIG. 3, FIG. 4a, FIG. 4b, FIG. 4c, FIG. 4d and FIG. 4e are flowcharts indicating a control operation of the microcomputer 1 shown in FIG. 1 in one example each.

FIG. 5b is a sectional view taken on line VB—VB of FIG. 5a.

DETAILED DESCRIPTION OF PREFERRED EMBODIMENT

Figure 1:
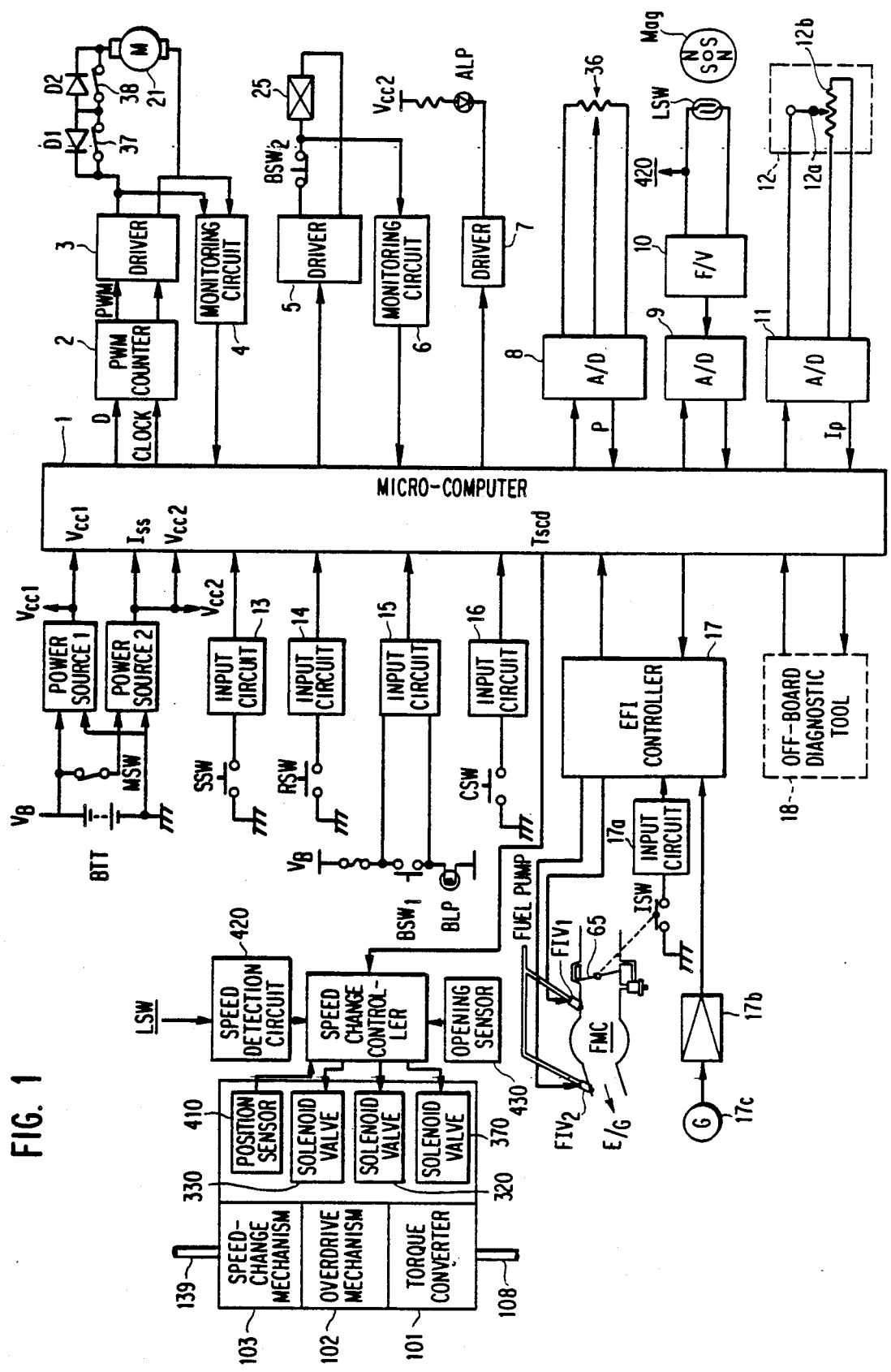
FIG. 1 is a block diagram representing an electric control circuit of a constant speed drive control unit given in one embodiment of the invention.

A general construction of one preferred embodiment of the invention is shown in FIG. 1. The embodiment is applied to the car provided with an automatic transmission with a lock-up function, on which the applicants have already applied for patent. The car is then provided with EFI, which stops a fuel injection of one system of the two with a throttle valve opening at an idling opening $P_{s1}$ or below (called "full close" hereinafter) as one condition when an engine load is light.

Figure 5A:
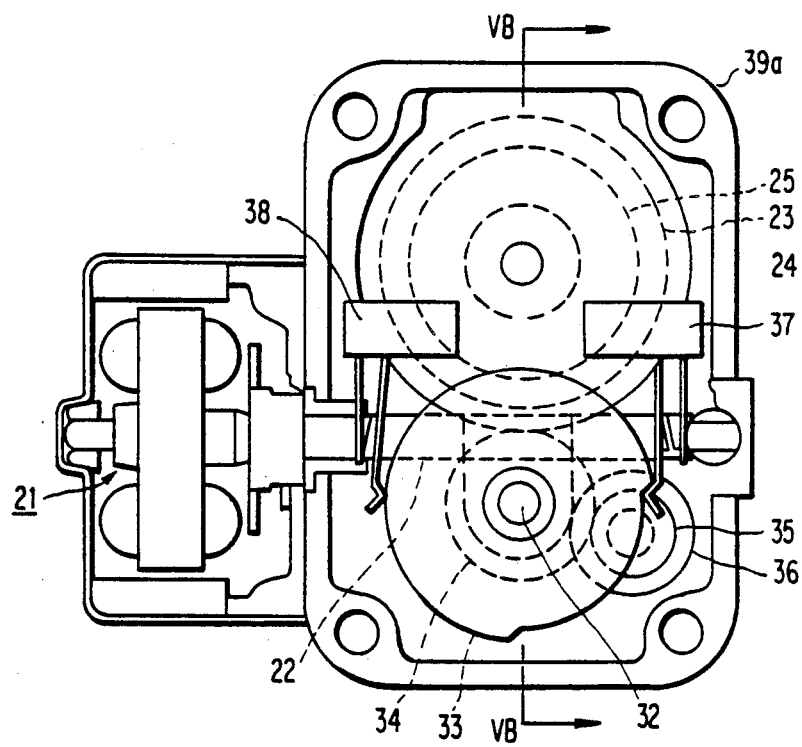
FIG. 5a is a sectional view showing a construction of a kinematic part of the unit of the,embodiment.
Figure 5B:
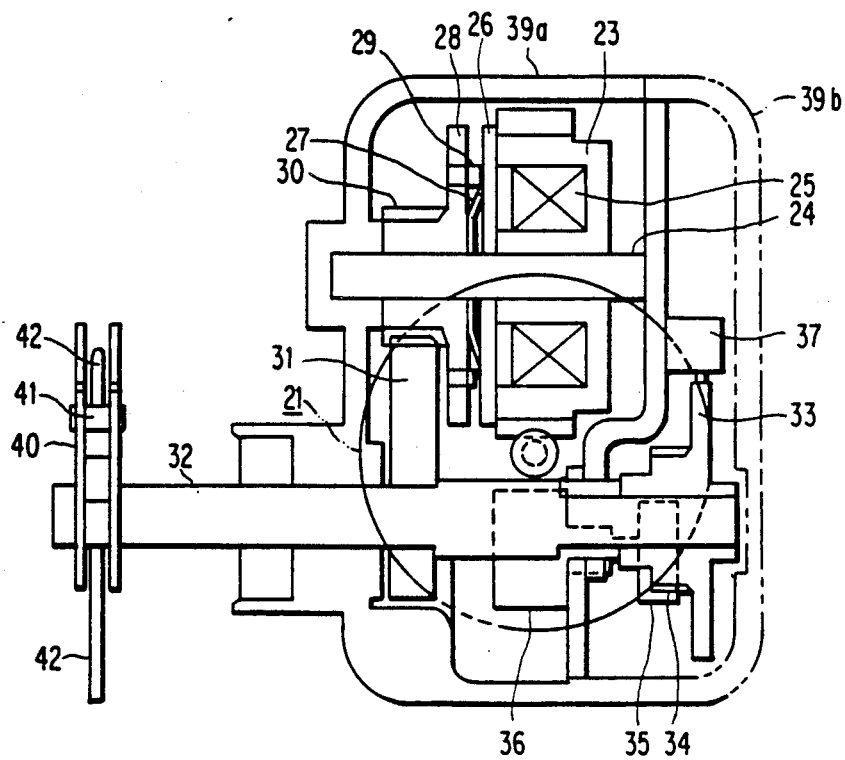

First, refer to FIG. 5a illustrating a transverse section of a motor-driven throttle valve driving mechanism which works as an actuator for the unit of the embodiment, and FIG. 5b illustrating a section taken on line VB—VB thereof.

A power source of the driving mechanism is a motor 21. The motor 21 is fixed on a case 39a, and its rotating shaft is coupled to a worm 22 journalled in the case 39a.

A clutch driving gear 23 is engaged with the worm 22. The clutch driving gear 23 is supported rotatably on a stationary shaft 24 fixed on the case 39a, encloses a coil 25 therein, and has a nonmagnetic clutch plate 26 fixed thereon. A circular groove is formed on the clutch plate 26, bearing an engaging projection 29 provided on a clutch face of a magnetic clutch driven gear 28 facing thereon through a leaf spring 27. That is, when a current is not carried to the coil 25, the clutch plate 26 and the clutch driven gear 28 are separated (clutch being off) by the leaf spring 27, therefore a turning force is not transferred between the clutch driving gear 23 and the clutch driven gear 28, however, once the coil 25 is conductive, an interlinkage magnetic flux generated on the coil 25 sucks in the clutch driven gear 28, and when the circular groove formed on the clutch plate 26 comes to face on the engaging projection 29 provided on the clutch face, both the two are coupled together (clutch being on), and a turning force is transferred between the clutch driving gear 23 and the clutch driven gear 28 (such mechanism being called an electromagnetic clutch hereinafter).

The clutch driven gear 28 is supported rotatably on the stationary shaft 24 as in the case of clutch driving gear 23, and has teeth 30 formed integrally thereon. The teeth 30 engage with a segment gear 31 fixed intermediately of an output shaft 32 supported rotatably on the case 39a.

A cam plate 33 is fixed on an inner end of the output shaft 32. Teeth 34 are formed integrally on the cam plate 33, and a gear 35 engaging with the teeth 34 is fixed on an input shaft of a potentiometer 36. The potentiometer 36 generates a voltage indicating a rotational angle of the output shaft 32 (throttle valve). Then, a cam groove is formed on the cam plate 33, and detects a limit position of the output shaft 32 from operating on limit switches 37 and 38. That is, when the rotational angle of the output shaft 32 exceeds an angle corresponding to an upper bound of the throttle opening, a working element of the limit switch 37 falls into the cam groove to off, and when it comes lower than an angle corresponding to a lower bound of the throttle opening, a working element of the limit switch 38 falls into the cam groove to off.

These cam plate 33, limit switches 37 and 38 and others are protected from dusts by a cover 39b.

Figure 5C:
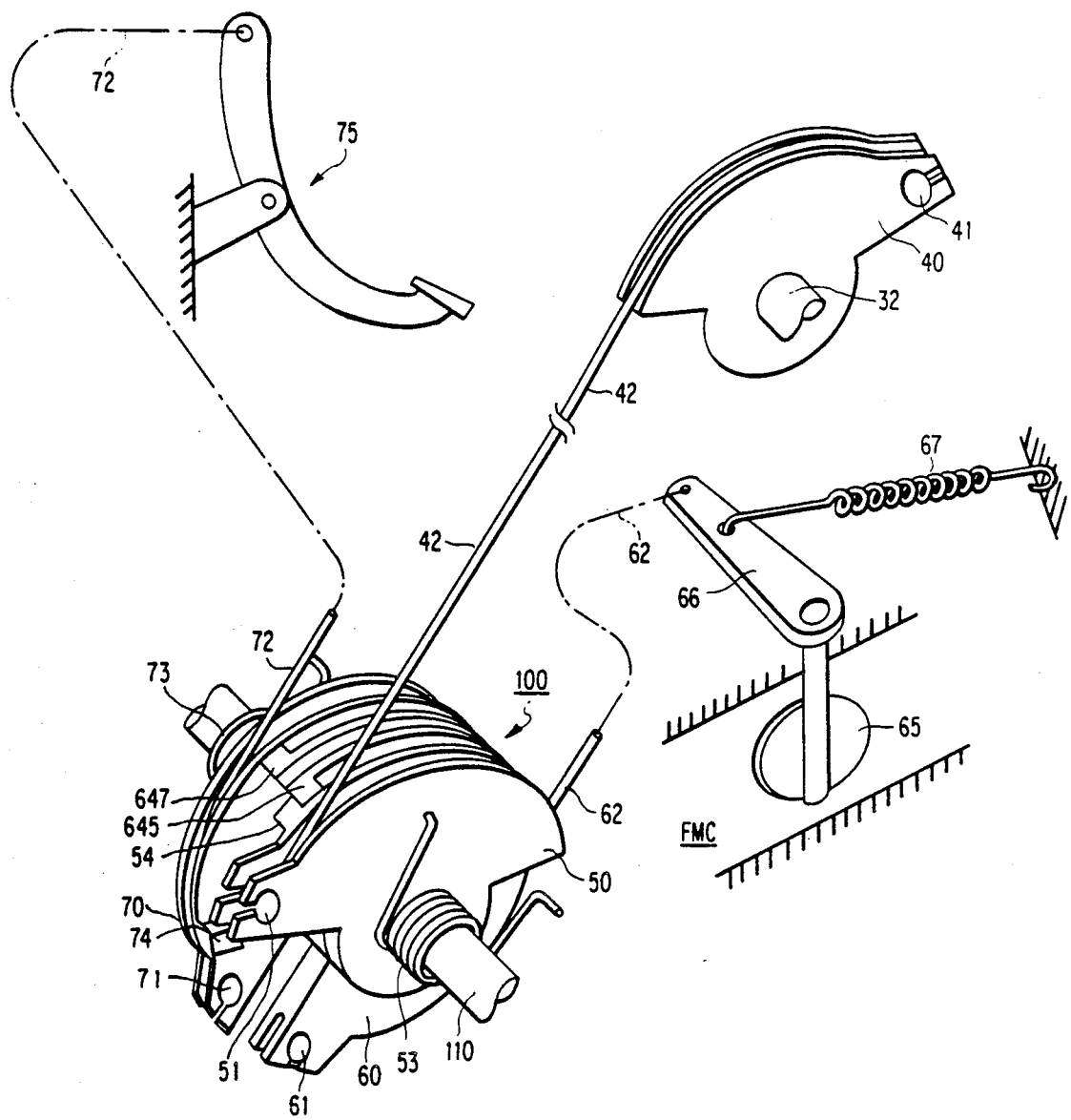
FIG. 5c is a perspective view showing a surface appearance of a coupler 100 for coupling an output pulley 40 shown in FIG. 5b and a throttle valve 65.

A segmental output pulley 40 is fixed on an outer end of the output shaft 32, where a pin 41 having fixed one end of a wire 42 thereon is locked The other end of the wire 42 is coupled to a coupling mechanism 100 shown in FIG. 5c.

With reference to FIG. 5c, the coupling mechanism 100 couples the aforementioned motor-driven throttle valve driving mechanism and an accelerator pedal 75 organically, and transfers their outputs to a throttle valve 65 provided in a mixing chamber FMC. The mechanism consists mainly of a segmental first pulley 50, a second pulley 60 and a third pulley 70, each of which is supported rotatably on a stationary shaft 110, and comprises holding the second pulley 60 from opposite sides by the first pulley 50 and the third pulley 70 therebetween.

The first pulley 50 is connected to the foregoing output pulley 40. That is, a pin 51 having fixed the other end of the foregoing wire 42 is locked here. Then, the first pulley 50 has a rotation in the direction where the wire 42 is wound thereon forced by a coil spring 53, and also has a projection 54 formed on the outside adjacent to the second pulley 60.

The third pulley 70 is connected to the accelerator pedal 75. The connection is realized through a wire 72, one end of the wire 72 is fixed on a pin 71 locked on the third pulley 70, while the other end is connected to a working point of the accelerator pedal 75. Then, the third pulley 70 has a rotation in the direction where the wire 72 is wound thereon forced by a coil spring 73, and also has a projection 74 formed on the outside adjacent to the second pulley 60.

The second pulley 60 is connected to the throttle valve 65. The connection is realized through a wire 62, one end of the wire 62 is fixed on a pin 61 locked on the second pulley 60, while the other end is connected to a working point of a link motion 66 coupled to the throttle valve 65. The link motion 66 has a force working in the direction where the throttle valve 65 is closed energized by a coil spring 67, and the force is transferred from the wire 62 to the second pulley 60. Accordingly, the second pulley 60 has a rotation in the direction where the wire 62 is delivered forced thereon, however, since a projection $64_5$ for bearing the projection 54 formed on the first pulley 50 and a projection $64_7$ for bearing the projection 74 formed on the third pulley 70 are formed on each of the opposite outsides, the rotation is regulated by a rotational angle of the first pulley 50 or the third pulley 70.

If observed from a side of the first pulley 50, the operation is such that when a turning force in the direction where wire 42 is delivered from the motor-driven throttle valve driving mechanism to the first pulley 50 is energized through the wire 42, the first pulley 50 and the second pulley 60 rotate integrally according to an engagement of the projection 54 and the projection $64_5$, the throttle valve 65 is driven to open through the wire 62 and the link motion 66, but if observed from a side of the third pulley 70, then the operation is such that when a turning force in the direction where the wire 72 is delivered from the accelerator pedal 75 to the third pulley 70 is energized through the wire 72, the third pulley 70 and the second pulley 60 rotate integrally according to an engagement of the projection 74 and the projection $64_7$, the throttle valve 65 is driven to open through the wire 62 and the link motion 66. In this case, when the first pulley 50 and the third pulley 70 are energized to rotate concurrently in the direction where the wire is delivered (the direction in which the wire 42 or 72 is delivered: the direction in which the wire 62 is wound in the second pulley 60), the one with a larger rotational angle in the direction becomes effective, and the other becomes idling, which will be apparent from FIG. 5c. In other words, it can be said that the second pulley 60 rotated in the direction where the wire 62 is wound by the first pulley 50 or the third pulley 70 will never have its rotation returned by the other On the other hand, a turning force impressed on the first pulley 50 by the coil spring 53 in the direction where the wire 42 is wound is transferred to the output pulley 40 of the motor-driven throttle valve driving mechanism through the wire 42, working on the clutch driven gear 28 from the output shaft 32 through the segmental gear 31. In this case, if an electromagnetic clutch is coupled (a turning force being transferred between the clutch driven gear 28 and the clutch driving gear 23), the clutch driving gear 23 is prevented from rotating by an engagement with the worm 22, therefore the first pulley 50 is locked, however, if the electromagnetic clutch is separated (a turning force not transferred between the clutch driven gear 28 and the clutch driving gear 23), then the output shaft 32 becomes almost unloaded, therefore the first pulley 50 is rotated by the coil spring 53 in the direction where the wire 42 is wound. That is, if no abnormity arises on the electromagnetic clutch when the coil 25 of the motor-driven throttle valve driving mechanism is deenergized, the first pulley 50 is rotated by the coil spring 53 in the direction where the wire 42 is wound and returned to an idling position (the second pulley 60 setting the throttle valve 65 at an engine idling opening when the projection 64$_5$ of the second pulley 60 comes in contact with the projection 54 of the first pulley kept at the idling position).

Meanwhile, the aforementioned motor-driven throttle valve driving mechanism is controlled by the electric control circuit shown in FIG. 1. The electric control circuit comprises a microcomputer (called CPU hereinafter) 1, a speed change controller 400 and EFI controller 17, and various kinds of driver, converter, input circuit, switch and others. A voltage $V_B$ from a battery BTT, a constant voltage $V_{cc}1$ through a first constant voltage supply $CPS_1$ and/or a constant voltage $V_{cc}2$ through a second constant voltage supply $CPS_2$ are supplied to each component part. While not particularly indicated in FIG. 1 for the supply line, a supply of the voltages $V_b$ and $V_{cc}1$ essentially requires on a connection of the battery BTT, which are supplied all the time so far as the battery BTT is connected. Then, a supply of the voltage $V_{cc}2$ further requires a closing of a main switch MSW, however, the voltage $V_{cc}2$ is supplied only to CPU 1 and an alarm lamp ALP as indicated in FIG. 1.

In CPU 1 the constant voltage $V_{cc}2$ from the second constant voltage supply $CPS_2$ is used for setting a standby mode and resetting to a normal mode. The standby mode is a power saving mode wherebY only a state of the register coming immediately before and a content of RAM are held with all I/O ports as high impedance, and a software operation is brought to a halt. CPU 1 sets the standby mode when an impression of the constant voltage $V_{cc}2$ comes to end. However, since it halts the software operation once the mode is set, a control of the hardware will be necessary for resetting to the normal mode. The port necessary therefor is a control port $I_{ss}$, and when the constant voltage $V_{cc}2$ from the second constant voltage supply $CPS_2$ is impressed on the control port $I_{ss}$, the mode is reset from standby to normal.

A function of each part will now be described.

PWM data D and a clock pulse are provided to PWM (Pulse Width Modulation) counter 2 from CPU 1. The PWM data is given in a value plus or minus, the sign denotes an energizing direction, and the size denotes on-duty. That is, when the PWM data D other than zero is provided, the PWM counter 2 turns the PWM pulse to an H level (high level), and if the sign is plus, it sets an energizing direction control signal to the H level, but if minus, then it sets the energizing direction control signal to an L level (low level) to commence counting of clock pulses, and when the count value becomes equal to an absolute value of the PWM data D thereafter, it turns the PwM pulse to L level.

The PWM pulse of the PWM counter 2 and the energizing direction control signal are provided to a motor driver 3. The motor 21 of the aforementioned motor-driven throttle valve driving mechanism is connected to the motor driver 3, and if the direction control signal is on the H level, the motor driver 3 energizes to rotate forward the motor 21 as long as the PWM pulse is kept on the H level, but if the direction control signal is on the L level, it energizes to reverse the motor 21 as long as the PWM pulse is kept on the H level. The above operation of the motor driver 3 is monitored by a monitor circuit 4.

The aforementioned limit switches 37 and 38 are interposed in series in an energizing line of the motor 21. These switches regulate rotations of the output shaft 32 exceeding a threshold. That is, as described hereinbefore, a forward rotation of the motor 21 is transferred to the output shaft 32 through the electromagnetic clutch, the output shaft 32 then rotates in the direction where the wire 42 is wound, and when the rotation exceeds the angle corresponding to an upper bound of the throttle opening, the limit switch 37 opens to prevent energizing for forward rotation of the motor 21, a reverse rotation of the motor 21 is transferred to the output shaft 32 through the electromagnetic clutch, the output shaft 32 rotates in the direction where the wire 42 is delivered, and when the rotation comes lower than the angle corresponding to a lower bound of the throttle opening, the limit switch 38 opens to prevent energizing for reverse rotation of the motor 21. Then, energizing for reverse rotation under the state where energizing for forward rotation of the motor 21 is prevented is realizable by a diode D1 connected in parallel to the limit switch 37, and energizing for forward rotation under the state where energizing for reverse rotation is prevented is realizable by a diode D2 connected in parallel to the limit switch 38.

The coil 25 of the aforementioned motor-driven throttle valve driving mechanism is connected to a solenoid driver 5. The solenoid driver 5 energizes the coil 25 on an electromagnetic clutch energizing instruction received from CPU 1, and also deenergizes it on an electromagnetic clutch deenergizing instruction received therefrom A normal closing brake switch $BSW_2$ interlocking with stepping on a brake pedal (not indicated) is interposed in an energizing line of the coil 25. The brake switch $BSW_2$ opens a contact whenever the brake pedal is stepped on, thus breaking the energizing line of the coil 25. Accordingly, the coil 25 is immediately deenergized from stepping on the brake pedal. Then, an operation of the solenoid driver 5 and an operation of the brake switch BSW$_2$ are monitored by a monitor circuit 6.

A lamp driver 7 energizes the alarm lamp ALP on a lamp energizing instruction received from CPU 1 (subject to a supply of the constant voltage V$_{cc}$2). The alarm lamp ALP is provided on a meter panel (not indicated) of automobiles, working as a back light for message reading "Undergo autodrive inspection".

Subjected to a chip select by CPU 1, an A/D converter 8 returns a detection voltage of the potentiometer 36 to CPU 1 through digital conversion; subjected to a chip select by CPU 1, an A/D converter 9 returns an output voltage of an F/V converter 10 to CPU 1 through digital conversion; subjected to a chip select by CPU 1, an A/D converter 11 returns a detection voltage of an inclination sensor 12 to CPU 1 through digital conversion.

The F/V converter 10 is that of converting a frequency into a voltage, converting into a voltage here a frequency of the signal generated from a lead switch LSW coming on/off on a magnetism of a rotary permanent magnet Mag coupled to an output shaft 139 of a transmission 103. That is, the F/V converter 10 generates a voltage signal proportional to a car speed.

The inclination sensor 12 has a pendulum 12a and a potentiometer 12b for detecting an angle of inclination of the pendulum 12a enclosed in a vessel charged with a damper oil, and is fixed on a horizontal reference plane of automobiles with the direction of oscillation as longitudinal. Accordingly, if an automobile inclines on an ascent or descent, the angle of inclination is detected by a relative inclination of the pendulum 12a keeping a verticality.

Input circuits 13, 14, 15 and 16 are input interfaces for CPU 1 to read on/off states of switches SSW, RSW, BSW$_1$ and CSW, each.

The switch SSW is a set switch operated by hand, and an operation of the switch indicates an execution instruction for constant speed drive control by a car speed when it is turned to OFF from ON. Then, the switch RSW is a resume switch also operated by hand, and an operation of the switch indicates an execution instruction for constant speed drive control by a stored car speed (car speed before release when the constant speed drive control is released).

As in the case of aforementioned brake switch BSW$_2$, the switch BSW$_1$ interlocks with stepping on a brake pedal (not indicated), however, this is a normal open brake switch, and a brake lamp BLP is connected in series thereto. Then, voltages across the brake switch BSW$_1$ are inputted to the input circuit 15, therefore on/off states of the brake switch BSW$_1$ can be detected despite a disconnection of the brake lamp BLP or a fuse inserted in series therein The switch CSW is a normal open clutch switch interlocking with stepping on a clutch pedal (not indicated).

The EFI controller 17 is a controlling device which works as a pivot of EFI unit (electron-controlled fuel injector unit), and an input circuit 17a with electromagnetic fuel injection valves FIV$_1$, FIV$_2$, and idling switch ISW connected thereto, an amplifier 17b to which a tachogenerator 17c is connected, a fuel pump not indicated therein, and various sensors such as pressure sensor, intake air temperature sensor, cooling water temperature sensor and the like are connected thereto.

The electromagnetic fuel injection valves FIV$_1$ and FIV$_2$ inject a fuel supplied from the fuel pump into a mixing chamber FMC at the time of energizing. Then, the idling switch ISW detects a lower bound opening Ps$_1$ (corresponding to idling of an engine (E/G)) of the throttle valve 65, and the tachogenerator 17c detects a rotational frequency of the engine.

A speed density system is employed for the EFI unit of the embodiment, and the EFI controller 17 controls the electromagnetic magnetic fuel injection valves FIV$_1$ and FIV$_2$ for energizing/deenergizing according to information detected by the idling switch ISW, the tachogenerator 17c, the pressure sensor, the intake air temperature sensor, the cooling water temperature sensor and others, and supplies a fuel at the rate required by the engine. Then, when the idling switch ISW detects the lower bound opening Ps$_1$ of the throttle valve 65, and the tachogenerator 17c detects the engine rotation at a predetermined rotational frequency or over, a supply of the one fuel of FIV$_1$ and FIV$_2$ is cut (fuel-cut), thus realizing an enhancement of brake power of the engine brake and an improvement of fuel consumption rate.

An input shaft of a torque converter 101 with a direct-coupled (lock-up) clutch is coupled to a rotation shaft 108 of the engine, an input shaft of an overdrive mechanism 102 is coupled to an output shaft of the torque converter 101, and a gear speed change mechanism 103 is coupled to an output shaft of the overdrive mechanism 102. An output shaft 139 of the gear speed change mechanism 103 drives wheels (not indicated) through propeller shaft (not indicated), differential gear (not indicated) and others.

The torque converter 101, the overdrive mechanism 102 and the gear speed change mechanism 103 are driven by an oil hydraulic circuit comprising a shift lever, a shift valve, directional control solenoid valves 320, 330 and a lock-up solenoid valve 370. A shift lever position sensor 410 detects a set position of the shift lever. A signal indicating the shift lever set position is provided to the speed change controller 400 consisting substantially of a microcomputer. Then, an opening sensor 430 is coupled to the throttle valve, and a signal indicating a throttle opening is provided to the controller 400. ON/OFF signals of the lead switch LSW are provided to a speed detection circuit 420, and the circuit 420 provides a car speed signal to the controller 400.

The automatic transmission described as above is similar in construction to that of having already been disclosed in Japanese Patent Application No. 111927/1979 by the applicant. However, a somewhat modification particularly on a control program whereby the speed stage is changed (shift-down) to a lower stage correspondingly to a shift-down instruction of CPU 1 is made thereto. An epitome of operation of the automatic transmission and a content of control operation according to the instruction of CPU 1 will be described hereinlater with reference to FIG. 6.

An off-board diagnosis tool (hereinafter called ODT) 18 is connected at the time of repair as occasion demands. The ODT 18 is provided with indicator, operating key and others, operating for input of output instruction of a diagnosis data, release instruction of an abnormal mode and others to CPU 1, and also for indication of the diagnosis data from CPU 1.

Next, an operation of CPU 1 will be described with reference to flowcharts given in FIG. 2, FIG. 3, FIG. 4a, FIG. 4b and FIG. 4c.

FIG. 2 and FIG. 3 will be referred to, first.

When the constant voltage $V_{cc}1$ is impressed from the first constant voltage supply $CPS_1$ upon connection of the battery BTT, CPU 1 initializes each I/0 port, internal register and RAM at S1 (S indicating a step or subroutine of the flowchart; numeral denoting a step No. or subroutine No. in the flowchart: the rest same as above), and then sets a standby mode from executing a standby instruction at S2.

When the main switch MSW is closed thereafter and the constant voltage $V_{cc}2$ (on H level) is impressed on a control port $I_{ss}$, the standby mode is reset to a normal mode and an initialization is executed at S10.

In the initialization, an output port and each flag (an abnormal flag $F_{ab}$ being excluded) described hereinlater, a register and memory (excluding a memory in which an initial opening setting table Pm is loaded, and a memorY in which a diagnosis data is loaded) are initialized, and a fuel-cut permission is given to the EFI controller 17.

After the initialization is over, CPU 1 runs processes S11 and the following repeatedly at a period of about 50 msec.

At S11 for running input read process, whether or not the constant voltage $V_{cc}2$ is impressed, states of the switches SSW, RSW, $BSW_1$ and CSW, an angle of rotation $P_p$ of the output shaft 32 of the motor-driven throttle valve driving mechanism on a detection voltage of the potentiometer 36, a car speed $V_p$ on an output voltage of the F/V converter 10 and an angle of inclination $I_p$ longitudinal of an automobile on a detection voltage of the inclination sensor 12 are read, and an acceleration speed $A_p$ is obtained from a variation of the car speed (the subscript "$p$" of each symbol representing a current value).

In S12, a process to be carried out next is selected according to the value of a selector register SEL. That is, if the value of the selector register SEL is "0", a standby process is carried out at S100; if "1", an initial opening setting process is carried out at S200; if "2", a constant speed control process is carried out at S300; and if "3", a cancel process is carried out at S400. However, the selector register SEL is initialized to "0" at the initialization. Accordingly, the standby process is taken up for description here at first, which will be given in order thereafter.

Figure 4A:
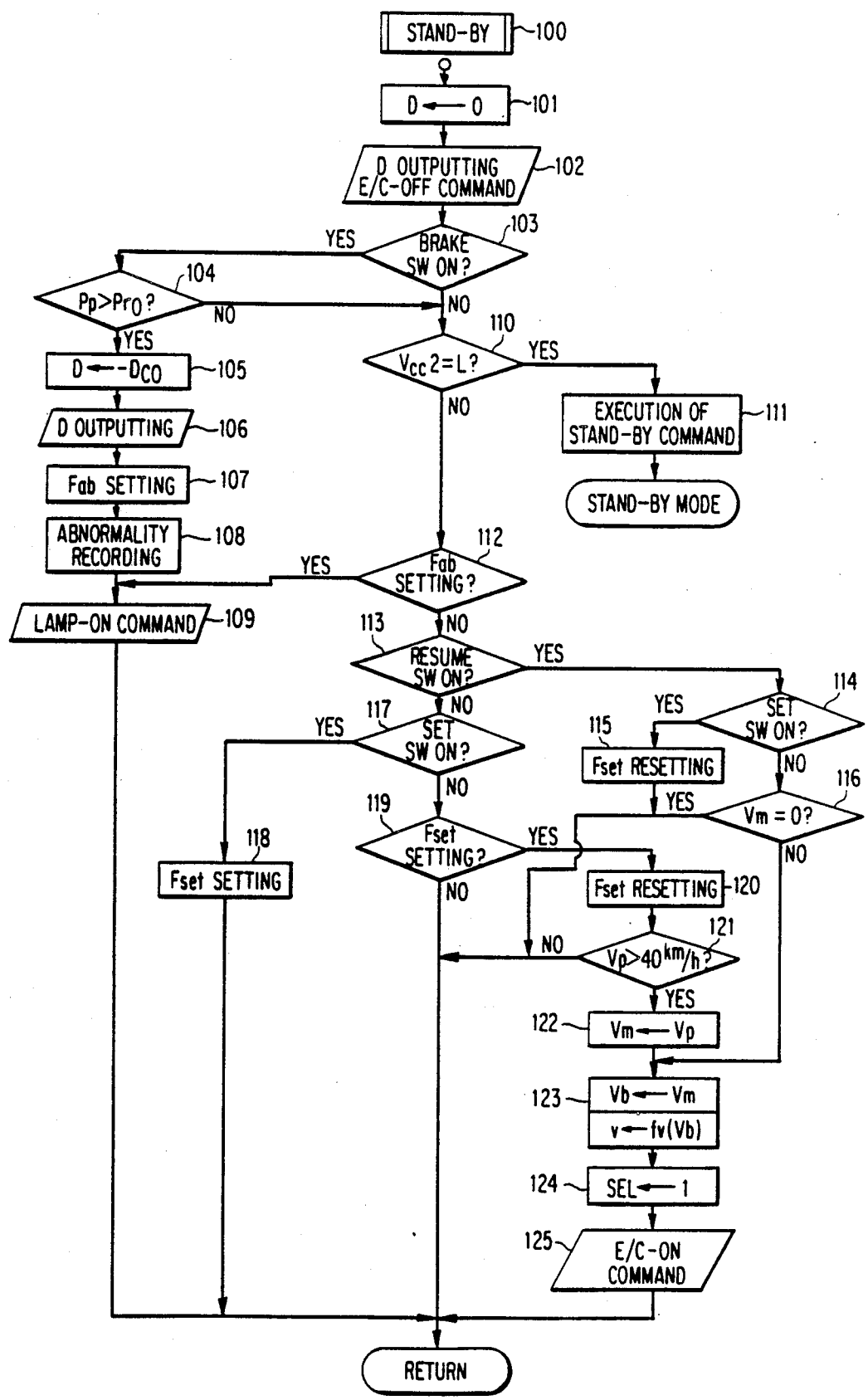
Figure 4B:
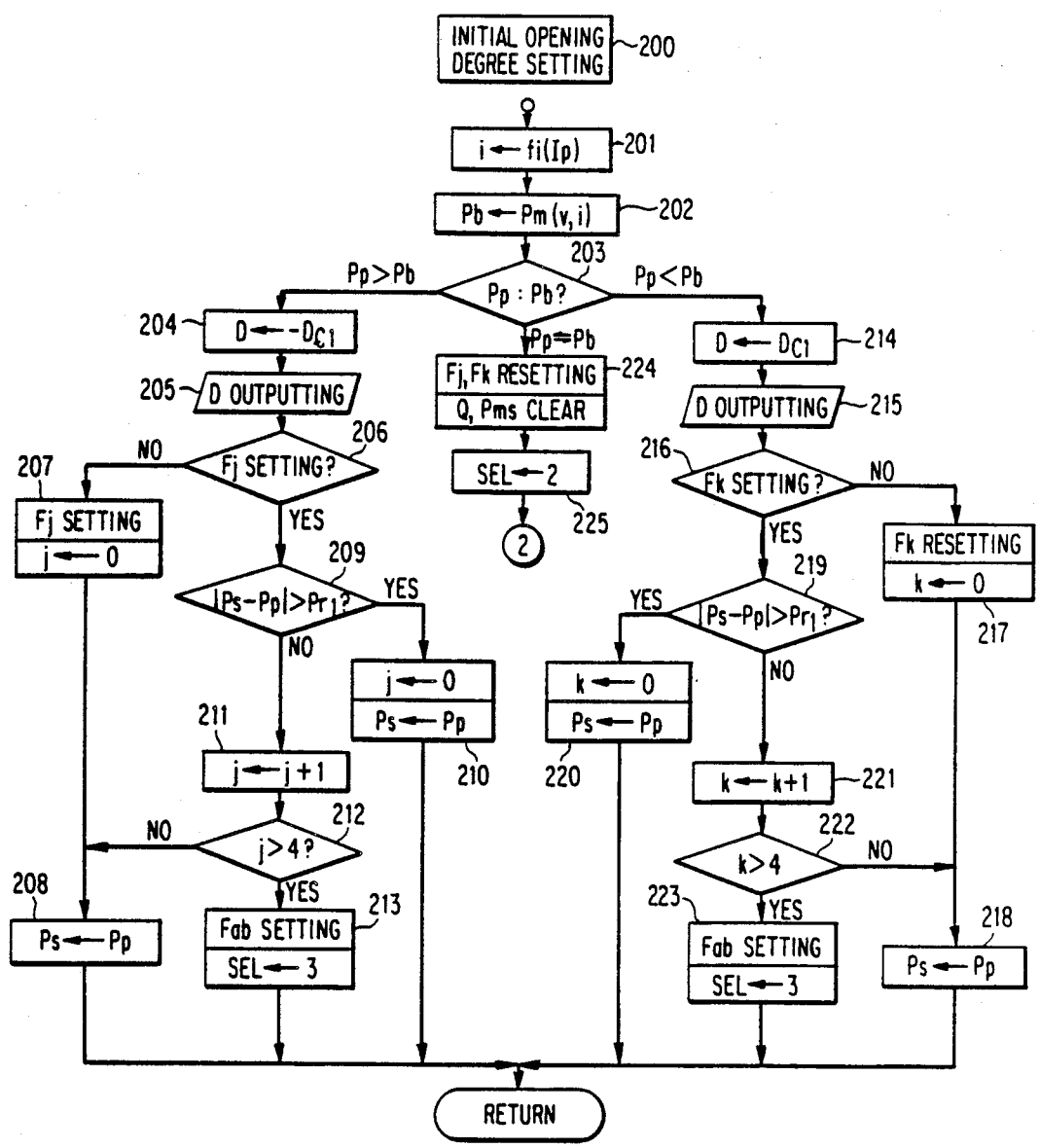

A reference is made to FIG. 4a.

In the standby process, first PWM data D is set to "0", which is outputted to the PWM counter 2, and deenergizing of the electromagnetic clutch (E/C in the flowchart) is indicated to the solenoid driver 5, the motor driver 3 deenergizes the motor 21 if so, and the solenoid driver deenergizes the coil 5 if so.

A check is then made on on/off states of the brake switch $BSW_1$ (S103), whether or not $V_{cc}2$ is impressed (S110), set/reset of the abnormal flag $F_{ab}$ (S112), on/off states of the resume switch RSW (S113), on/off states of the set switch SSW (S117), and set/reset of a set flag $F_{set}$ (S119).

When an on state of the brake switch BSW1 is detected in S103, the angle of rotation $P_p$ of the output shaft 32 is checked in S104. As described hereinbefore, the angle of rotation $p$ of the output shaft 32 corresponds to an angle of the throttle valve 65, and must be returned to an idling angle (the angle of rotation of the output shaft 32 when the first pulley 50 is at the aforementioned idling position) $P_{r0}$ ($P_{s1}$) when the electromagnetic clutch is energized. That is, if the angle of rotation $P_p$ of the outPut shaft 32 exceeds the idling angle $P_{r0}$ in this case, then it is conceivable that something is wrong with a coupling of the electromagnetic clutch, and thus the clutch plate 26 and the clutch driven plate 28 cannot be seParated from each other, therefore PWM data D is set to a high speed reversing constant $D_{c0}$ in S105, which is outputted to PWM counter 2. Thus, the motor driver 3 having received PWM pulse of PWM counter 2 energizes the motor 21 for high speed reversing, therefore the output shaft 32 is returned forcedly to the idling angle $P_{r0}$ when there is a fault arising on a coupling of the electromagnetic clutch.

When such fault arises, it is preferable that a use of the constant speed driving gear be forbidden entirely, therefore the abnormal flag $F_{ab}$ is set at S107 to forbid a use of the constant speed driving gear thenceforward entirely Then, the fault thus occurred is recorded as a diagnosis data at S108, and the lamp driver 7 is designated to energize the alarm lamp ALP at S109, thereby indicating a message reading "Undergo autodrive inspection".

Then, CPU 1 holds the abnormal flag $F_{ab}$ until a release of the abnormal mode is indicated from ODT 18, returns to S109 from S112 as long as it is set and does not go any further to S113 and thereafter, therefore the constant speed driving gear of this embodiment does not operate practically.

When no impression of the constant voltage $V_{cc}2$ is detected in S110, a standby instruction is executed in S111 and a standby mode is set.

When an on-state of the resume switch RSW is detected in S113, the set switch SSW is checked at S114. Since a double operation of the resume switch RSW and the set switch SSW is forbidden in the constant speed driving gear of this embodiment, when an on-state of the set switch SSW is detected here, the set flag $F_{set}$ is reset in S115 to return to the main routine thereafter, and a special process is not carried out any more.

When an on-state of the resume switch RSW not from double operation is detected, a memory car speed $V_m$ is checked at S116. If a constant speed drive control has not been carried even once until the on-state of the resume switch RSW is detected after closing of the main switch MSW, then the memory car speed $V_m$ becomes "0", therefore an operation of the resume switch RSW is meaningless, thus returning to the main routine, however, if not, the step goes forward to S123. The following will be referred to for processes at S123 and thenceforward.

When an on-state of the set switch SSW is detected in S117, the set flag $F_{set}$ is set in S118 to return to the main routine. If the set switch SSW is not operated any further, then since the set flag $F_{set}$ has been set, the step goes forward to S120 from S119.

In S120 the set flag $F_{set}$ is reset, and the car speed $V_p$ is checked in S121. In the constant speed driving gear of this embodiment, a constant speed drive control at 40 km/h or below is forbidden, therefore the car speed $V_p$ is registered as the memory car speed $V_m$ in S122, subject to the then car speed $V_p$ exceeding 40 km/h.

In S123, a desired car speed $V°$ is set by the memory car speed $V_m$, and a sequential number v with the car speed divided into a plural stage is obtained through the desired car speed $V_b$ and a function $f_v$. The sequential number v will works as an address when an angle of rotation of the output shaft 32 corresponding to an initial opening of the throttle valve 65 is obtained at an initial opening setting process described next.

A value of the selector register SEL is set to "1" in S124 thereafter, the solenoid driver 7 is designated to energize the electromagnetic clutch in S125, and then the step returns to the main routine.

In the main routine, since the value of the selector register SEL is set to "1", the step goes forward to S200 from S12, where the initial opening setting process is carried out. The initial opening setting process will be described with reference to FIG. 4b.

Here, a sequential number i with an angle of inclination divided into a plural stage is obtained through an angle of inclination $I_p$ and a function $f_i$ in S201, and an initial opening setting table $P_m$ is retrieved by means together of the sequential number v obtained previously. In the initial opening setting table $P_m$, the angle of rotation of the output shaft 32 corresponding to an initial opening of the throttle valve 65 is stored divisionally into a car speed stage and an angle of inclination stage, therefore CPU 1 reads the angle of rotation of the output shaft 32 corresponding to an initial opening of the throttle valve 65 corresponding to the desired car speed $V_b$ and the angle of inclination $I_p$ of an automobile, which is assigned by the then sequential numbers v and i, and sets a desired angle of rotation $P_b$ of the output shaft 32. Then, a standard data is loaded in the initial opening setting table $P_m$ at the time of shipment, however, it is updated to a proper data through learning as described hereinlater.

In S203, the angle of rotation $P_p$ of the output shaft 32 and the desired angle of rotation $P_b$ are compared with each other. In this case, if the angle of rotation $P_p$ exceeds a tolerance limit and thus is greater than the desired angle of rotation $P_b$, then PWM data D is set to a reversing constant $-D_{c1}$ in S204, which is outputted to PWM counter 2 at S205. Thus, PWM counter 2 generates the aforementioned PWM pulse, and the motor driver 3 having received it energizes the motor 21 for reversing, however, if PWM counter 2 or motor driver 3 gets faulty for some reason or other, or the motor 21 or a transfer mechanism is locked, it does not come out as a rotation of the output shaft 32. Now, therefore, such fault is detected in such manner as described below in S206 to S212.

In S206, a count flag $F_j$ will be checked. If the flag is reset, then it is set at S207, and after clearing a count register j, the angle of rotation $P_p$ of the then output shaft 32 is registered as an angle of rotation of the motor 21 before energizing (called angle of rotation before energizing) $P_s$, and then the step returns to the main routine.

Since the count flag $F_j$ is set, the step goes forward to S209 from S206 when carrying out the initial opening setting process next. S209 is a process to check a change in angle of rotation of the output shaft 32 for one processing cycle, i.e. a degree of $|P_s - P_p|$. If the difference $|P_s - P_p|$ exceeds a threshold $P_{r1}$, then it is decided that the output shaft 32 is rotating normally, and thus the step goes forward to S210, clears the count register j, updates the angle of rotation before energizing $P_s$ and returns to the main routine, however, when the difference $|P_s - P_p|$ is at the threshold $P_{r1}$ or below, it is decided that something is abnormal with a rotation of the output shaft 32, and thus the step goes forward to S211, increases the count register j by 1, updates the angle of rotation before energizing $P_s$ and returns to the main routine.

If the state where it is decided that something is abnormal with a rotation of the output shaft 32 lasts in excess of 4 processing cycles continuously, a value of the count register j exceeds 4. In such case, the abnormal flag $F_{ab}$ is set at S213, a value of the selector register SEL is set to "3", and a selection of a cancel is reserved Then, S400 for cancel process will be described later with reference to FIG. 4e.

Upon decision that the angle of rotation $P_p$ of the output shaft 32 is still less than the desired angle of rotation $P_b$ even from including the tolerance limit when comparing both the two in S203 the motor 21 is energized for forward rotation in S214 and thenceforward as monitoring a change appearing in the angle of rotation of the output shaft 32. These processes are equivalent to replacing the reversing constant "$-D_{c1}$" by forwarding constant "$D_{c1}$", the count flag $F_j$ by a count flag $F_k$, and the count register j by a count register k in the processes described in S204 to S213a above, therefore a further description will be omitted here.

Upon decision that the angle of rotation $P_p$ of the output shaft 32 and the desired angle of rotation $P_b$ are equivalent within a tolerance limit when comparing both the two in S203, the count flags $F_j$ and $F_k$ are reset in S224, an address table Q and an initial opening update table $P_{ms}$ to be described hereinlater are cleared, a value of the selector register SEL is set to "2" in S225, and then the following constant speed control process is carried out.

The constant speed control process will be described with reference to FIG. 4c.

In S301, PWM data D is set through operation:

$$G\{V_b - (V_p + CT \cdot A_p)\} \tag{1}$$

by means of a preset loop gain G, the desired car speed $V_b$, the then car speed $V_p$, a preset compensating time constant CT (time constant for compensatinq a lag of car speed change to opening change of the throttle valve 65), and the then acceleration speed $A_p$, which is outputted to PWM counter 2 in S302. Thus, PWM counter 2 generates the aforementioned PWM pulse, and the motor driver 3 having received it energizes the motor 21 for forwarding or reversing. If PWM data D in this case has a magnitude to some extent (at a threshold $D_r$ or over), a change in angle of rotation of the output shaft 32 will be observed by the then energized motor 21 (barring the case where the output shaft 32 exceeds the angle corresponding to an upper bound of the throttle opening, or the case where it comes lower than the angle corresponding to a lower bound) unless an abnormity arises on PWM counter 2, motor driver 3, motor 21, transfer mechanism and others. In other words, if such abnormity arises, then a change in angle of rotation of the output shaft 32 cannot be observed. Those S304 to S312 represent a process for detecting such abnormity when energizing of the motor 21 for reversing is set (signifying that PWM data D having a magnitude at the threshold $D_r$ or over has been outputted to PWM counter 2 or so), and those S314 to S322 represent a process for detecting such abnormity when energizing of the motor 21 for forwarding is set.

In S304 the count flag $F_j$ is checked. When the flag is reset, the angle of rotation $P_p$ of the then output shaft 32 is checked continuously in S305. If the angle of rotation $P_p$ comes lower than a lower bound angle of rotation $P_{r2}$ set according to the angle corresponding to an upper bound of the throttle opening, the step then goes forward straight to S325, however, if it is at the lower bound angle of rotation $P_{r2}$ or over, then the count flag $F_j$ is set and $F_k$ is reset, the count register j is cleared, the angle of rotation $P_p$ of the then output shaft 32 is registered as the angle of rotation before energizing $P_2$, and then the step goes forward to S325.

The count flag FJ is set in this case, therefore when carrying out the constant speed control process next, the step goes forward to S307 from S304. As in the case of S209 or S219 for initial opening setting process described hereinabove, S307 is a process for checking a change in angle of rotation of the output shaft 32 for one processing cycle, i.e. a degree of $|P_s - P_p|$. If the difference $|P_s - P_p|$ does not exceed the threshold $P_{r1}$, then it is decided that the output shaft 32 rotates normally, and the step goes forward to S308, where the count flag $F_j$ is reset, however, if the difference $|P_2 - P_p|$ is at the threshold $P_{r1}$ or below, it is decided that something is abnormal with rotations of the output shaft 32, and the step goes forward to S309, the count register j is increased by 1, and then the angle of rotation before energizing $P_s$ is updated in S311.

If the state where it is decided that the output shaft 32 rotates abnormally lasts in excess of four processing cycles continuously while energizing of the motor 21 for reversing is set (outputting PWM data D with a magnitude at $D_r$ or over), then a value of the count register j exceeds 4. In such case, the abnormal flag $F_{ab}$ is set in S312, the count flag $F_j$ is reset, a value of the selector register SEL is set to "3" to reserve a selection of the cancel process, a permission of fuel-cut is provided to EFI controller 17, and then the step returns to the main routine.

Processes to be carried out in S314 to S323 are equivalent to replacing the count flag $F_j$ by the count flag $F_k$. the count flag $F_k$ by the count flag $F_j$, the count register j by the count register k, the lower bound angle of rotation $P_{r2}$ by an upper bound angle of rotation $P_{r3}$ each in the processes carried out in the above S304 to S313, and also to reversing the less than sign in S315 coordinating with S305, therefore a further description will be omitted here.

When PWM data D set at S301 and outputted toward PWM counter at S302 has not such magnitude as will be at the threshold D, or over, the count flags $F_j$ and $F_k$ are reset at S324, and then the step goes forward to S325 and on.

In S325, a deviation between the then car speed $V_p$ and the desired car speed $V_b$ is checked. If the deviation comes within a tolerance limit $V_r$ or below, then the opening of the throttle valve 65 is regarded as reflecting almost accurately on the car speed, and the initial opening update table $P_{ms}$ for updating data in the initial opening setting table $P_m$ is created at S326 and on. That is, in S326, the sequential number v with the car speed divided into a plural stage is obtained through the car speed $V_p$ and function $f_v$, the sequential number i with the angle of inclination divided into a plural stage is obtained through the angle of inclination of automobile $I_p$ and the function $f_i$, the address table Q is retrieved by the sequential numbers v and i, an address q of a space area of the initial opening update table $P_{ms}$ assigned by the sequential numbers v and i is obtained, and in S327, the angle of rotation $P_p$ of the then output shaft 32 is loaded in an area $P_{ms}(v,i,q)$ of the initial opening update table $P_{ms}$ assigned by the sequential numbers v and i and the address q. In S328 thereafter, the address q is updated and written in an area Q (v,i) assigned by v, i of the address table Q, and then the step returns to the main routine.

When the deviation between the car speed $V_p$ and the desired car speed $V_b$ comes out of the tolerance limit $V_r$ through a check at S325, "shift-down/release decision" S323 is carried out.

Figure 4D:
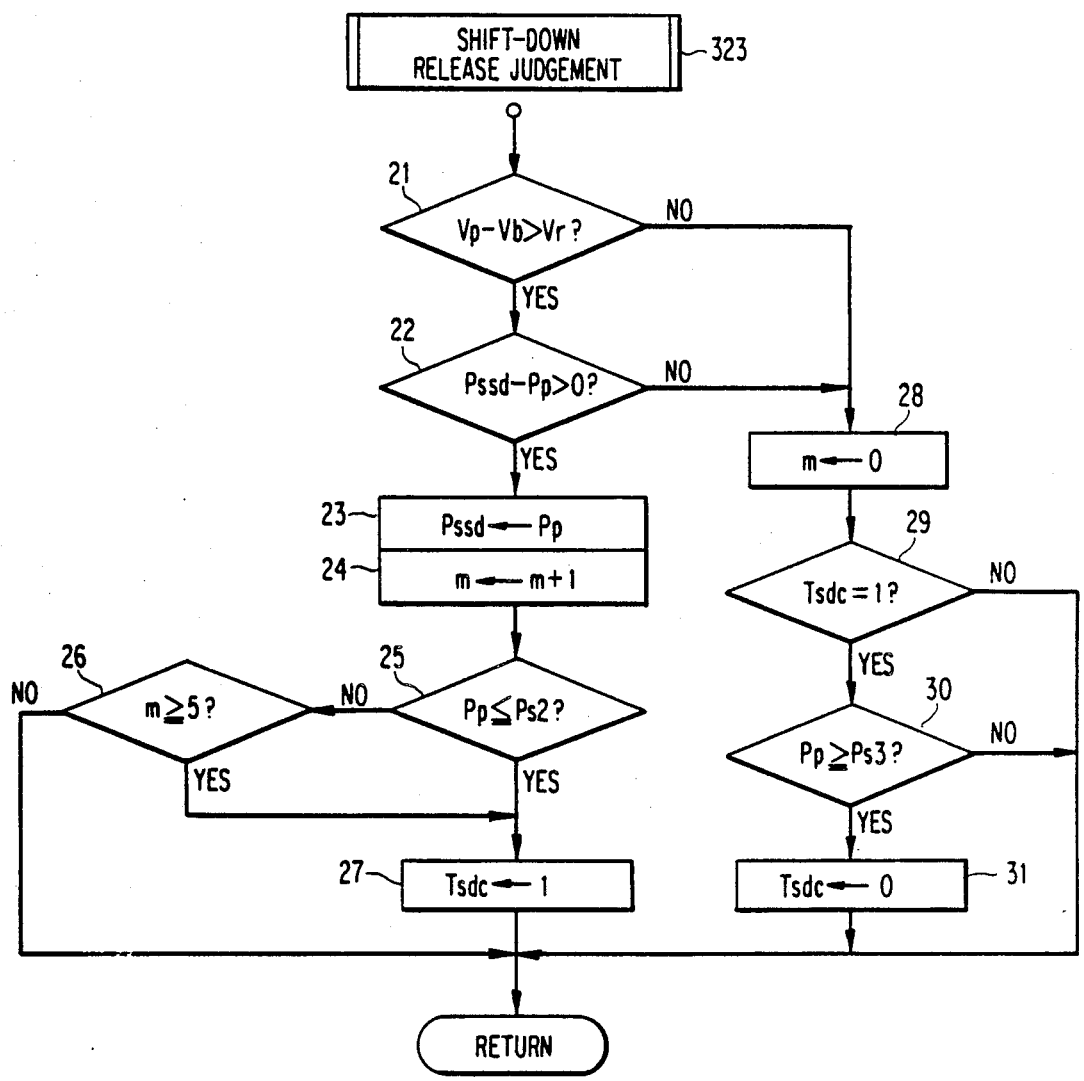

A content of "shift-down/release decision" is shown in FIG. 4d. In the subroutine, whether or not the car speed $V_p$ deviates to a high side is checked first (S21). If so, then whether or not the throttle opening $P_p$ read this time is smaller than a throttle opening $P_{ssd}$ (content of a register $P_{ssd}$) read last time (before one processing cycle) is checked (S22), and if smaller, then $P_p$ is updated and stored in the register $P_{ssd}$ (S23), content of a count register m is increased by 1 (S24), whether or not the throttle opening $P_p$ this time is a second set point $P_{s2}$ ($P_{s2}$ being 5% in opening in this embodiment where the first set point $P_{s1}$ whereat EFI cuts a fuel injection is 0% in opening) or below, or whether or not a content of the count register m is 5 or over is checked (S25, S26), and when either one is realized (the running speed $V_p$ being higher by $V_r$ or more than the desired speed $V_b$ and the throttle opening being at $P_{s2}$ or below, or the running speed $V_p$ being higher by $V_r$ or more than the desired speed $v_b$ and a decrease in the throttle opening continuing for 5 processing cycles or more), "1" is written in an output register $T_{sdc}$, and "1" assigning a shiftdown is outputted to the speed change controller 400 (27).

Then, as will be described hereinlater, upon receipt of the shift-down designation signal "1", the speed change controller 400 sets the speed change mechanisms 102, 103 to a stage one lower than the then set speed stage. The engine brake action becomes high to decrease the car speed according to the shift-down, the car speed comes lower than a set point and the throttle valve is opened correspondingly thereto, and thus the throttle opening increases. The speed change controller 400 does not change speed (shift-up) beyond the speed stage shifted down until the shift-down designation signal "1" goes out thereafter (changing from "1" to "0") (inhibit of shift-up), and the shift-down is carried out whenever the condition is realized.

CPU 1 then goes forward to "shift-down/release decision" S323 to check whether or not the car speed $V_p$ deviates to a high side (S21), and if the car speed $V_p$ deviates to a low side as a result, the count register m is cleared (28), a content of the output register $T_{sdc}$ is checked, and if it is 1 (shift-down command outputted), then whether or not the throttle opening $P_p$ is at $P_{s3}$ (opening being 10%) or over is checked (30), and if so, then the output register $T_{sdc}$ is cleared (31), and the shift-down designation signal ("1") to the speed change controller 400 is modified to a release signal ("0"). That is, the shift-down designation signal is erased (31).

From running the above-described "shift-down/release decision" (S323), the shift-down designation is outputted to the speed change controller 400, if the running speed $V_p$ becomes higher by $V_r$ or more than the desired speed $V_b$ at running on a descent on high speed stage, and further the throttle opening becomes $P_{s2}$ (5%) or below or a decrease of the throttle opening continues for 5 process cycles or over, that is, an excess the running speed does not stop despite decreasing the throttle valve opening.

Figure 4E:
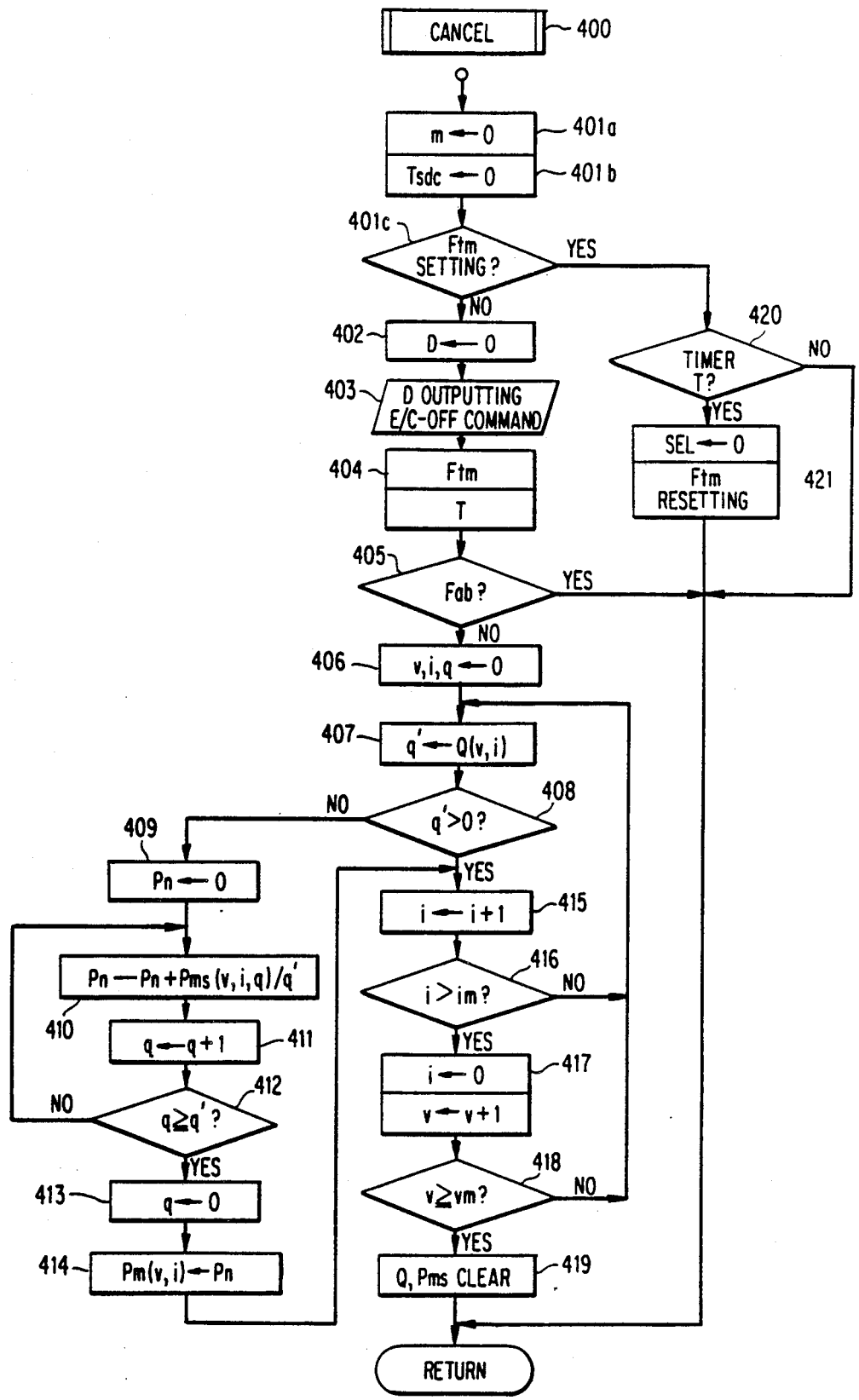

If the running speed $V_p$ comes lower by $V_r$ or more than the desired speed $V_b$, and further the throttle opening becomes $P_{s3}$ (10%) or over thereafter, the shift-down designation signal is released. Then, when release of a constant speed drive such braking or the like is inputted under the state where the shift-down designation is outputted, "cancel" (400) shown in FIG. 4e is run, and the shift-down designation is released (erased).

Here, a reference is made again to FIG. 3.

In a loop for carrYing out the initial opening setting process or the constant speed control process, whether or not $V_{cc2}$ is impressed (S13), on/off states of the brake switch BSW: (S14) and on/off states of the clutch switch CSW (S13) are monitored, and when no impression of $V_{cc2}$, on-state of the brake switch BSW1 or on-state of the clutch switch CSW are detected, a value of the selector register SEL is set to "3" in S16 and a selection of the cancel process is reserved.

The cancel process will be described with reference to FIG. 4e.

Here, first, the count register m is cleared (S401a), the register $T_{sdc}$ is cleared and the shift-down designation signal to the speed change controller 400 is released (erased) (S401b), and a timer flag $F_{tm}$ is checked at S401c. When the cancel process is carried out for the first time, since the timer flag $F_{tm}$ is reset, PWM data D is set to 0 in S401, it is outputted to PWM counter 2 in S403 and deenergizing of the electromagnetic clutch is designated to the solenoid driver 5, the timer flag $F_{tm}$ is set at S404 to clear and start a timer T.

Then data in the initial opening setting table $P_m$ is updated according to data in the initial opening update table $P_{ms}$ generated at the constant speed control process, however, if there arises any abnormity before carrying out the cancel process, then a reliability of data in the initial opening update table $P_{ms}$ is regarded as low, and thus data in the initial opening setting table $P_m$ is not updated. That is, the abnormal flag $F_{ab}$ is checked in S405, and when it is set, no further process will be carried out and the step returns to the main routine.

In S406 the sequential numbers v, i and the address q are initialized, and in S407 an address q' of a space area of the initial opening update table $P_{ms}$ assigned by the sequential numbers v and i is obtained from the address table Q. The address q' coordinates with the number of updating data written in a column assigned by the sequential numbers v and i of the initial opening update table $P_{ms}$. Now, when the value exceeds 0, the step goes forward to S409 from S408, an update register $P_n$ is cleared, and then in S410 to S412, a mean value of all updating data in the column assigned by the sequential numbers v and i of the initial opening update table $P_{ms}$ is obtained to the update register $P_n$. When obtained, the address q is reinitialized in S413, and the mean value obtained to the update register $P_n$ is loaded in an area $P_m(v,i)$ assigned by the sequential numbers v and i of the initial opening setting table $P_m$ in S414.

The above processes S407 to S414 are carried out whenever the sequential number i is updated (S415), and when the sequential number i makes a round, the sequential number v is updated (S417) to repetition, and the initial opening setting table $P_m$ is updated.

When update of the initial opening setting table $P_m$ is over, the address table Q and the initial opening update table $P_{ms}$ are cleared in S419, and the step returns to the main routine.

When carrying out the cancel process secondly, since the timer flag $F_{tm}$ is set, the step goes forward to S420 from S401 to monitor the timer T. The timer T is that for gaining time for the first pulley 50 of the coupling mechanism 100 (FIG. 5c) to be returned to idling position by the coil spring 53, and when the time is up thereon, a value of the selector register SEL is set to "0" in S421, the timer flag $F_{tm}$ is reset, and the step returns to the main routine.

When the value of the selector register SEL is set to "0", the aforementioned standby process is carried out in the main routine.

Figure 6:
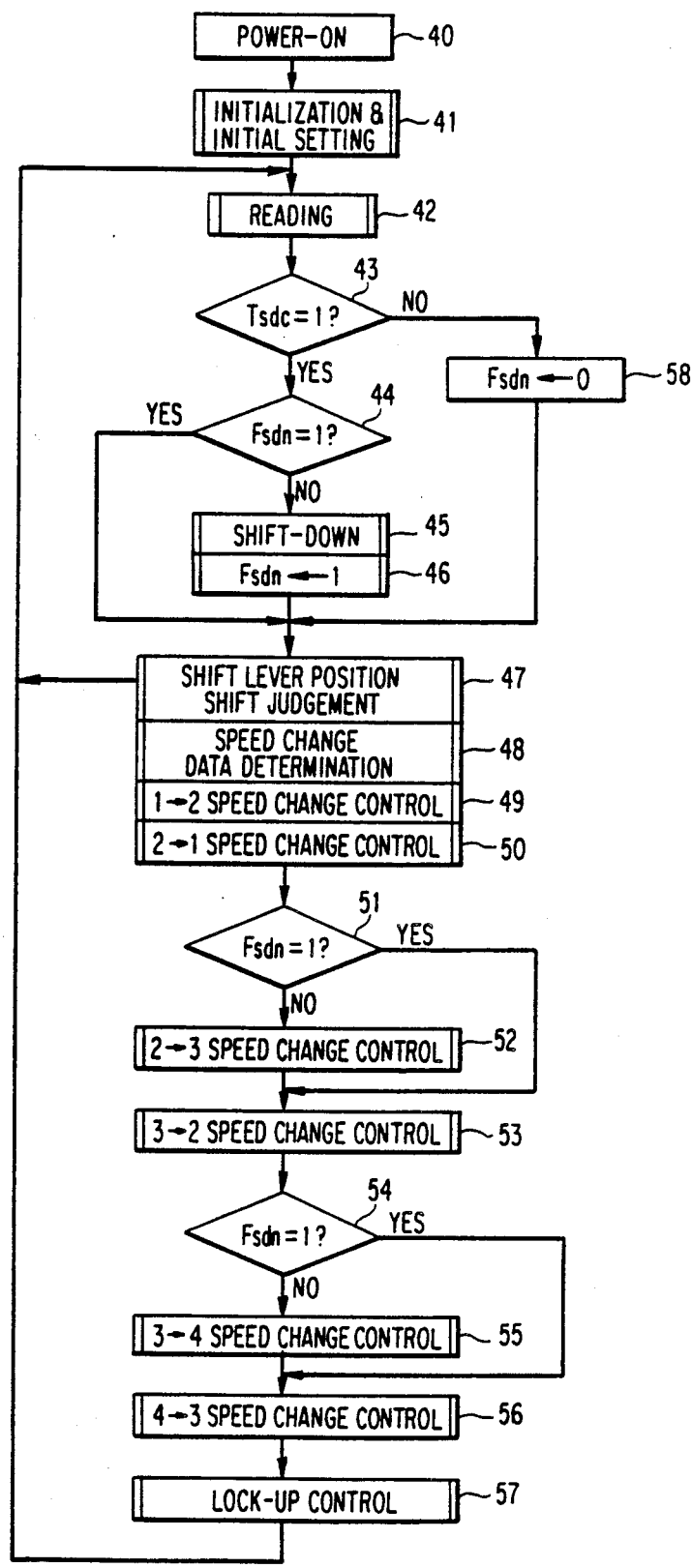
FIG. 6 is a flowchart indicating a control operation of a microcomputer of the speed change controller 400 shown in FIG. 1.

Referring next to FIG. 6, the speed change controller 400 actuated on power operates for initialization and initial setting (S40, S41), and then reads to input (S42). Next, whether or not the signal $T_{sdc}$ from CPU 1 is "1" (shift-down assignment) is checked (S43), and a process coordinating with $T_{sdc}$ is carried out, the content of which will be described hereinlater. When the processing step passes, a decision on shift lever position shift is made, where transfer of the shift lever, N position and others are detected (S47), and when it is N position, the step returns again to read (S42). When the shift lever is changed from N to D (drive), 2 or 1, a speed change reference data with which to shift the speed stage up or down (maximum or minimum value of the car speed to the throttle opening, whereby each speed stage is maintained, shifted up or down: shift-up when running speed exceeds the maximum value; shift-down when running speed comes at the minimum value or below) is determined (S48). Processes are then continued as 1→2 speed change (shift-up) control (S49), 2→1 speed change (shift-down) control (S50), 2→3 speed change control (S52), 3→2 speed change control (S53), 3→4 speed change control (S55), 4→3 speed change control (S56) and lock-up control (S57), thus repeating read (S42) to lock-up control (S57). In these speed change controls, from comparing the maximum and minimum values in the speed change reference data assigned to a current speed stage which are so assigned to a current throttle opening with the current car speed, if the current car speed reaches the maximum value or over, it is decided that the shift-up is required, but if the current car speed comes to the minimum value or below, then it is decided that the shift-down is required If so, then the shift-up or shift-down is carried out after releasing the lock-up. However, if not otherwise, the speed stage is not modified, and the step goes forward to the next. In a lock-up control (S57), the current car speed is compared with those of maximum value (coordinating with the throttle opening) and minimum value (coordinating with the throttle opening) assigned to the speed stage set currently, which are assigned to the current throttle opening, and if the current car speed reaches the maximum value or over, a lock-up is effected, but if it comes to the minimum value or below, the lock-up is released.

The above-described speed change control and lock-up control have already been disclosed in detail in the foregoing Japanese Patent Application No. 111927/1979, therefore a further description will be omitted here Referring now in detail to an operation of the speed change controller 400 corresponding to a shift-down designation ($T_{sdc}$=1) from the aforementioned CPU 1, when reading a signal level of the signal $T_{sdc}$ from CPU (S42), the speed change controller 400 checks whether or not it is 1 (shift-down) (S43), and if it is 1, whether or not a flag ($F_{sdn}$=1) indicating having already effected a shift-down corresponding to the shift-down designation is present is checked (S44), but if not (the shift-down having not yet been effected correspondingly to the designation), then the lock-up is released, speed stages of the speed change mechanisms 102, 103 are set to the stages one lower from those currently set (45), and "1" is written in a register $F_{sdn}$ (46). Since a content of the register $F_{sdn}$ is 1 in steps S51, S54 for $F_{sdn}$ being 1, 2→3 speed change control (S52) and 3→4 speed change control (S55) are skipped, and hence these shift-ups are not carried out thereafter. When conditions are realized, the shift-down will be carried out.

When a shift-up is thus prohibited, if CPU 1 zeroizes the signal $T_{sdc}$ (releasing the shift-down signal), the speed change controller 400 reads it (S42), and a content of the register $F_{sdn}$ is cleared at the step S58 by way of the step (S43). Thus, 2→3 speed change control (S52) and 3→4 speed change control (S55) will be carried out, and the shift-up is effected when the condition is realized.

As described above, according to the constant speed drive control unit of the invention, if, for example, a car comes to run on a descent while running on a high speed stage, the running speed ($V_p$) becomes higher than the desired speed ($V_b$), and the speed control means (1) contracts the throttle opening ($P_p$). That is, a change in the throttle opening corresponds reversely to the change in running speed. When the throttle opening ($P_p$) comes to $P_{s2}$ (5%), the speed control means (1) generates a shift-down designation signal ($T_{sdc}=1$), and the speed change control means (400) shifts the speed change mechanisms (102, 103) down to a lower speed stage in response thereto. An engine brake effect is enhanced by the shift-down, a correlation of the change in throttle valve opening ($P_p$) with the change in running speed ($V_p$) becomes high, that is, the running speed ($V_p$) corresponds directly to the throttle opening ($P_p$), the running speed ($V_p$) decreases, and thus the speed control means (1) enlarges the throttle opening ($P_p$) correspondingly thereto.

Thus, the speed change mechanisms are shifted down on the throttle valve opening ($P_p$) being at $P_{s2}$ (5%) which is larger than $P_{s1}$ (0%) whereat EFI stops fuel injection, a relation of the running speed ($V_p$) with the throttle valve opening ($P_p$) is inverted to a direct correspondence from inverse, that is, an engine brake operates sufficiently to decrease the running speed ($V_p$), the throttle valve is opened to match the running speed ($V_p$) to the desired speed ($V_b$), and the throttle valve opening ($P_p$) is kept at $P_{s2}$ (5%) or over. Accordingly, EFI does not stop fuel injection, and hence a surge will never arise at the time of descent.

What is claimed is:

1. A constant speed drive control unit, comprising:
   drive means for driving a throttle valve for a car provided with a fuel injection controller for cutting a fuel supply to an engine at the time of low load subject to an opening of the throttle valve of the engine on said car being at a first predetermined opening $P_{s1}$ or below as one condition, and an automatic transmission controller for setting a speed stage of a speed change mechanism correspondingly to a driving torque of the engine and a car speed;
   opening detection means for detecting the opening of said throttle valve;
   speed detection means for detecting a running speed of the car;
   speed control means for energizing said drive means in the direction where the running speed is concordant with a desired speed through comparing both the two, and generating a shift-down assignment signal when the running speed exceeds the desired speed, and the opening of the throttle valve comes to a second predetermined opening $P_{s2}$ or below which is larger than said first predetermined opening $P_{s1}$; and
   speed change control means for changing the speed stage of the speed change mechanism to a lower stage in response to said shift-down assignment signal.

* * * * *